United States Patent [19]

Tokarski

[11] Patent Number: 5,713,626
[45] Date of Patent: Feb. 3, 1998

[54] MACHINE BASE FOR SUPPORTING LOADING PRESS

[76] Inventor: Gerald L. Tokarski, 1101 14th St., Otsego, Mich. 49078

[21] Appl. No.: 232,489

[22] Filed: Apr. 25, 1994

[51] Int. Cl.⁶ ............................................. A47B 39/00
[52] U.S. Cl. ................. 297/171; 297/195.11; 297/440.1; 297/440.22
[58] Field of Search ................. 297/195.11, 170, 297/171, 174, 156, 440.1, 452.2, 440.24, 452.4, 440.22, 172, 217.1; 248/676, 448, 903; 42/94; 312/235.2

[56] References Cited

U.S. PATENT DOCUMENTS

| | | | |
|---|---|---|---|
| 2,115,497 | 4/1938 | Mintz | 297/172 X |
| 2,215,657 | 9/1940 | Anderson | 297/156 X |
| 2,982,338 | 5/1961 | Ernst | 297/156 X |
| 3,399,925 | 9/1968 | Levy | 297/156 |
| 3,622,199 | 11/1971 | Ho | 297/172 |
| 3,899,164 | 8/1975 | Newman | 248/448 X |
| 4,057,244 | 11/1977 | Gaspar | 297/156 X |
| 4,099,771 | 7/1978 | Mathews | 297/217.1 |
| 4,296,963 | 10/1981 | Blanchard et al. | 297/156 X |
| 4,632,410 | 12/1986 | Bainbridge et al. | 297/135 X |
| 5,054,852 | 10/1991 | Tholkes | 297/172 |
| 5,378,037 | 1/1995 | Beasley et al. | 297/135 X |
| 5,407,171 | 4/1995 | Gonzalez | 248/676 X |

FOREIGN PATENT DOCUMENTS 444866  12/1934  United Kingdom ............... 297/172

*Primary Examiner*—Milton Nelson, Jr.
*Attorney, Agent, or Firm*—Flynn, Thiel, Boutell & Tanis, P.C.

[57] ABSTRACT

A base for locking and supporting a cartridge loading press and an operator, which can be easily and quickly reconfigured from a storage configuration to a working configuration, and vice versa. The base includes a frame, an operator support seat secured to the frame, a loading press supporting platform secured to the frame at a location vertically higher than the seat, a ring secured to the frame below the supporting platform, and a detachable cross member. In the storage configuration, the detachable cross member is detached from the frame and the effective frame width is reduced to seven inches, which permits the base to be stored under a bed. In the working configuration, the detachable cross member is attached to the frame and the effective frame width is increased to stabilize the base and permit the weight of the press, base, and operator to be more efficiently distributed across the floor. In either configuration the operating lever of the press can be locked to the base through the ring by a long shackle lock.

12 Claims, 4 Drawing Sheets

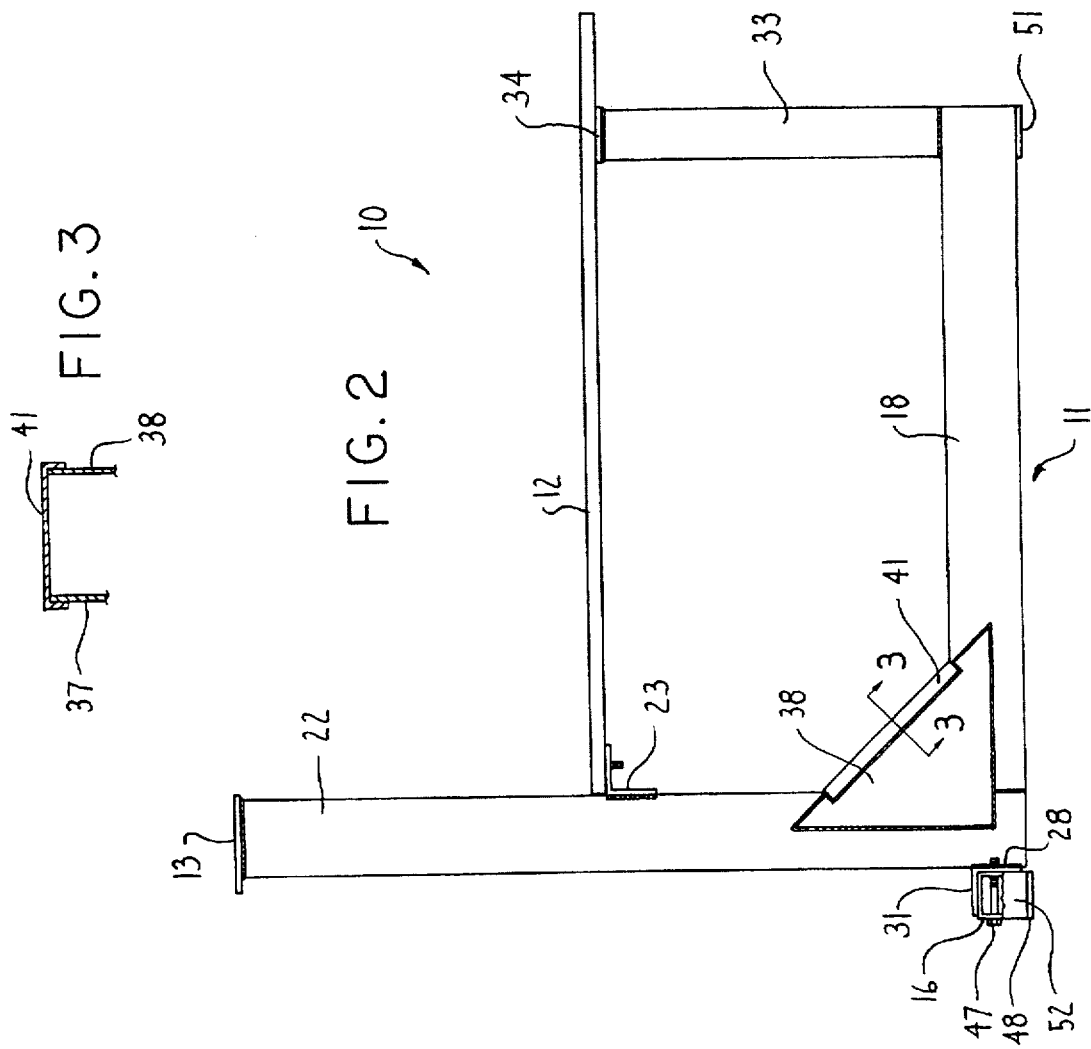

5,713,626

MACHINE BASE FOR SUPPORTING LOADING PRESS

FIELD OF THE INVENTION

The present invention relates generally to a framework for supporting a working device and, more particularly, to a machine base with provision for machine lock-out for supporting a cartridge loading machine and a seated operator.

BACKGROUND OF THE INVENTION

The art of loading ammunition is just slightly older than the first shot. And from that time to this, those that practice the techniques of loading ammunition strove to achieve that ultimate goal of loading perfectly accurate ammunition. It is through centuries of loading improvements that today's ammunition is loaded to such precise tolerances and achieves levels of accuracy once addressed only in theory.

The corner stone of that accuracy is process repeatability. Ammunition loading is an exacting hobby and a handloader must know that his equipment is capable of applying exactly the same pressure over exactly the same distance every loaded cartridge. To accomplish this special heavily built hand-operated loading presses are employed. Typically of machined iron, these presses are capable of exerting five tons (10,000 pounds per square inch) of forming pressure or seat a match grade bullet to one thousandth of an inch. All this is accomplished through a compound leverage cam system by the operator's applied force to a long operating lever. The weak link, in this precise application of forming power and movement, is the work table to which the equipment is anchored.

Primarily of wood, these tables are subject to its flaws, dimensional instability through changing humidity, and a tendency to compress under load bearing conditions. These variables will, with average use, loosen the press's mounting bolts and supporting members producing undesirable press movement and thereby require frequent tightening. Some loaders have bolted steel plates to the tables which are, of necessity, anchored to the floor and or wall to slow the movement and loosening process.

This work table requires considerable space and is seldom considered a suitable addition to the dwelling's decor. This restrictive condition has limited access of this hobby to primarily home owners with ample room for erecting such a work table. Mobile home and apartment dwellers, condo owners and renters have been unable to participate.

Accordingly, it is the object of the present invention to provide the support strength required to allow a loading press to operate at its fullest potential. The machine base's three point stance and substantially reinforced frame that utilizes the combined weight of the loading machine, the machine's base and the seated operator provide substantial mass producing a stable and solid work platform. In an alternate configuration the invention can be reduced dimensionally to facilitate storage under a bed or in the back of a convenient closet. In either configuration the machine base provides a means to prevent accidental or unauthorized operation by disabling the attached loading press.

SUMMARY OF THE INVENTION

The objects and purposes of the invention, including those set forth above, are met according to one form of the invention by providing a machine supporting base including a frame, an arrangement to support a seated operator on the frame, and an arrangement for supporting a loading press on the frame at a location vertically higher than the operator supporting arrangement.

The invention also encompasses a configurable machine base for supporting a working device and an operator, including a frame, an operator support seat detachably secured to the frame, a working device support platform secured to the frame at a location vertically higher than the seat, and an arrangement for reconfiguring the frame from a storage configuration to a working configuration.

BRIEF DESCRIPTION OF THE DRAWINGS

A preferred embodiment of the invention is described in detail hereinafter with reference to the accompanying drawings, in which:

FIG. 2 is an elevational side view of the machine base of FIG. 1;

FIG. 3 is a central sectional side view taken along the line 3—3 in FIG. 2, and showing a gusset cap secured to spaced-apart gusset plates of the machine base;

DETAILED DESCRIPTION

FIGS. 1 through 5 depict a machine base 10 for supporting a loading press which embodies the present invention.

Figure 1:
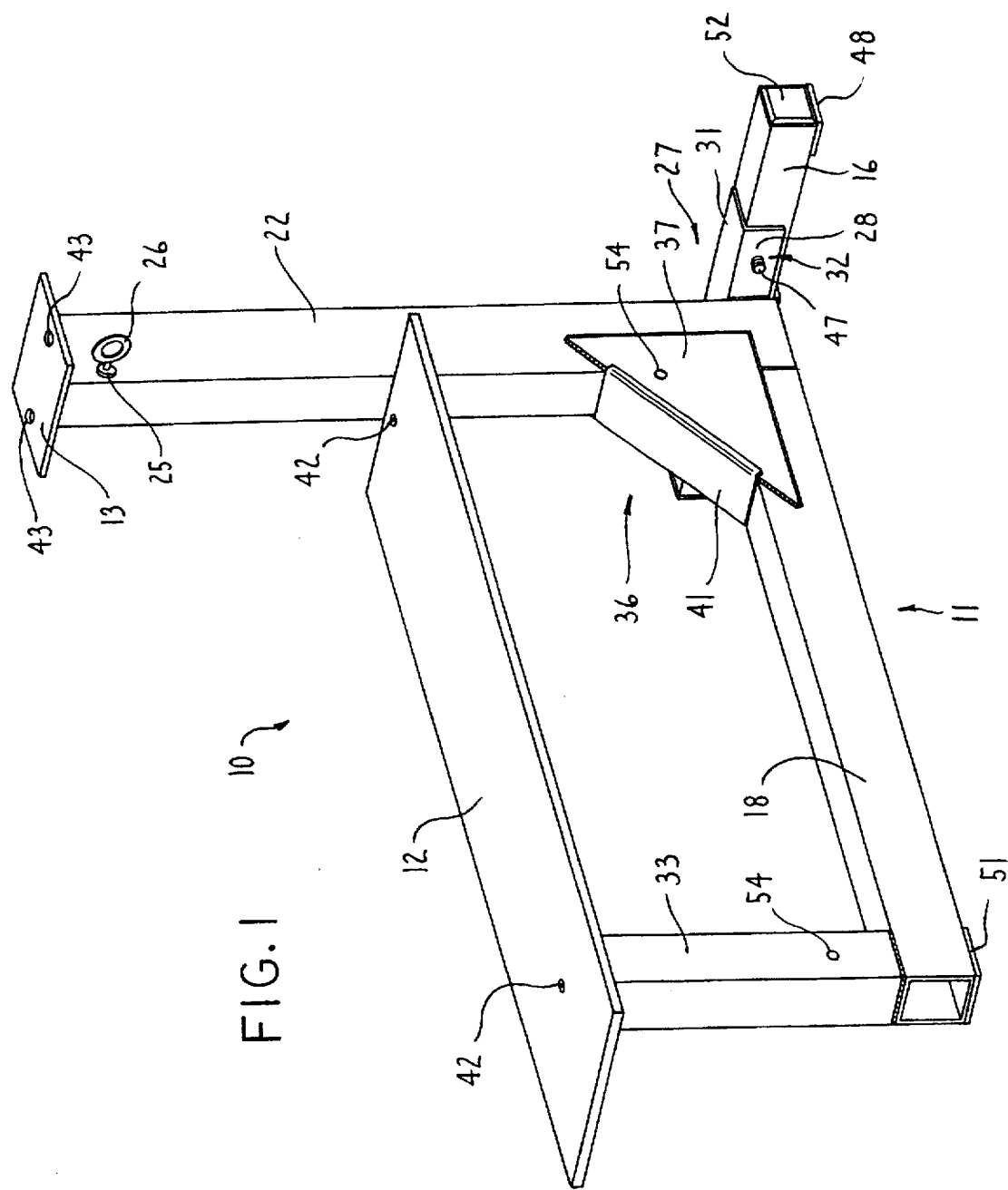
FIG. 1 is a perspective view of a machine base which can support a not-illustrated loading device and which embodies the present invention.
Figure 4:
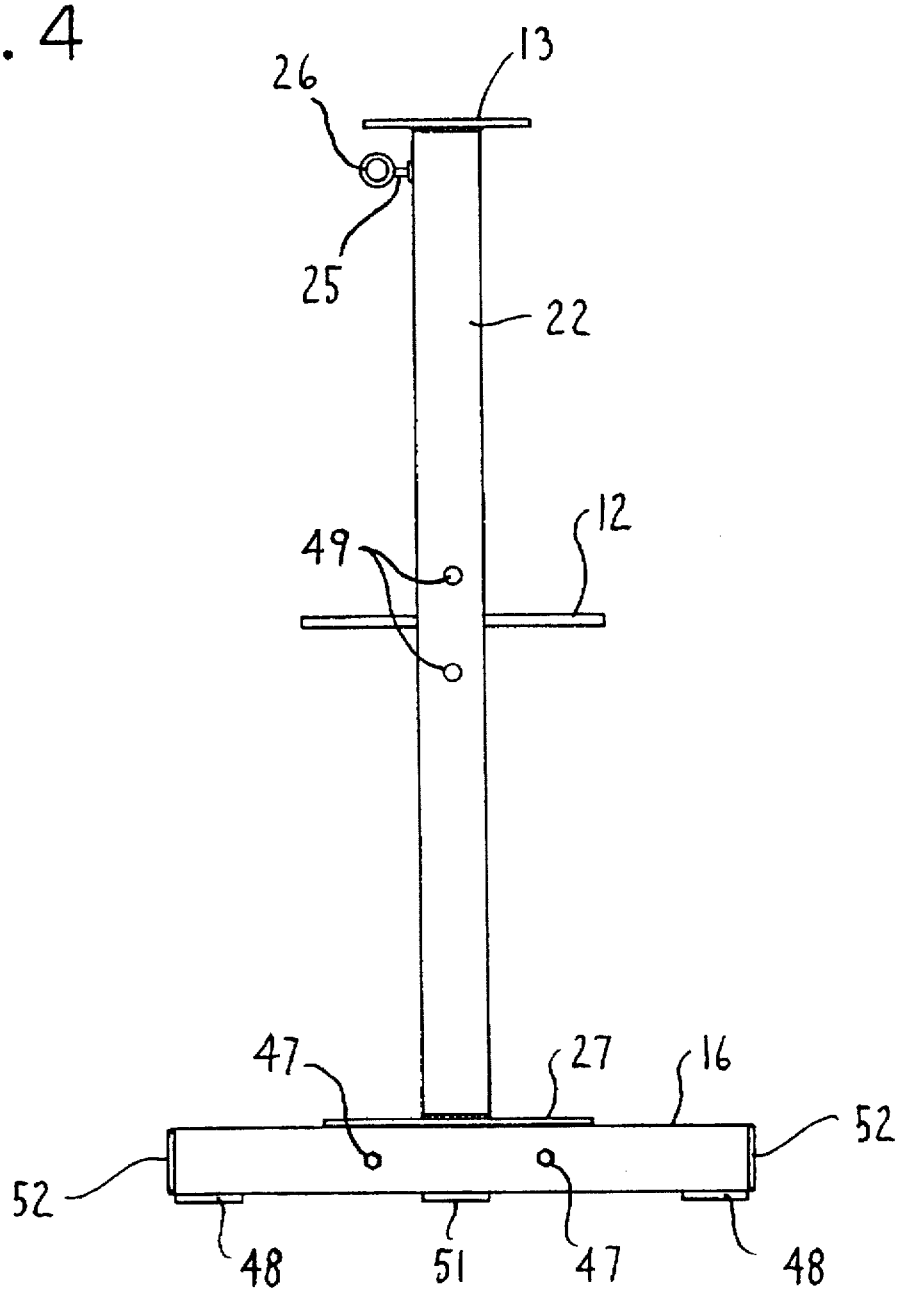
FIG. 4 is an elevational front view of the machine base of FIG. 1.
Figure 5:
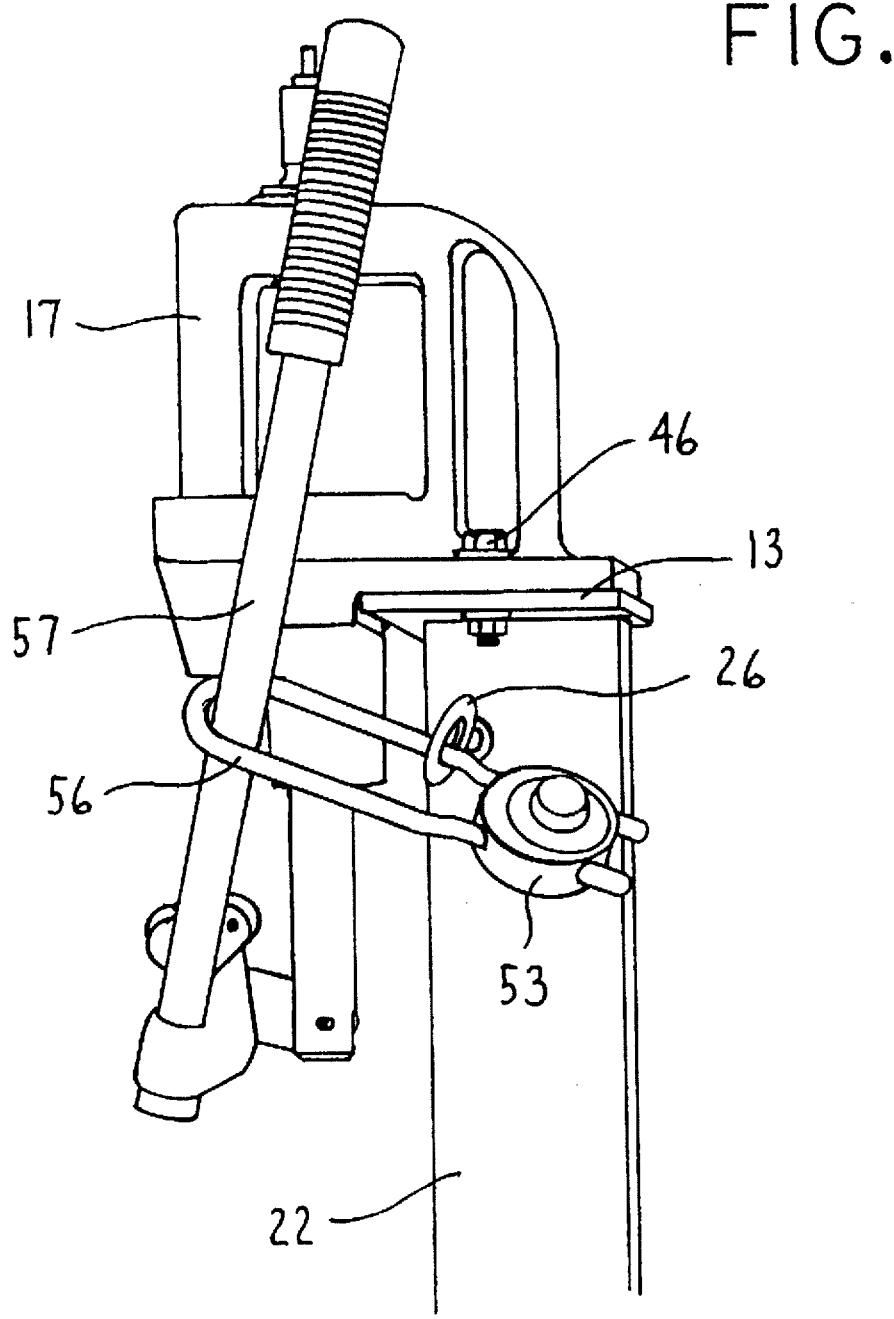
FIG. 5 is a perspective view of a support pillar and a supporting platform of the machine base of FIG. 1, and a conventional loading press secured thereto and locked out.

Referring to FIGS. 1 and 2, the machine base 10 includes a frame 11, a detachable operator seat 12, a loading press supporting platform 13, and a detachable elongate cross member 16. A conventional and commercially available loading press 17 can be detachably secured to the supporting platform 13, as shown in FIG. 5.

The frame 11 includes an elongate base member 18 extending approximately horizontally.

A first support pillar 22 is welded to, and extends vertically upward from, a front end of the base member 18. An L-shaped seat bracket 23 has one leg welded to a rear surface of the first pillar 22 at a position vertically lower than the supporting platform 13, and a further leg projecting horizontally rearwardly. A ring 26 extends from a side surface of the first pillar 22 below the supporting platform 13, and in particular is welded to that surface on pillar 22. Two spaced-apart threaded through holes 49 on the front surface of pillar 22 facilitate the storage of cross member 16. The spacing of holes 49 correspond to the holes drilled through the cross member 16. When detached, the cross member 16 can be secured to pillar 22 by threading bolts 47 through the cross member 16 and through holes 49.

An L-shaped bracket member 27 has a first leg 28 secured to a lower front surface of the first pillar 22, and a second leg 31 projecting forwardly approximately perpendicular to the first leg 28 from an upper end thereof. The bracket member 27 is approximately seven inches in length and extends traverse to the base member 18 to impart a minimum effective frame width of approximately seven inches to the base 10. The first leg 28 includes two threaded bolt holes 32.

A second support pillar 33 is welded to, and extends vertically upward from, a rear end of the base member 18 to approximately the same vertical height as the seat bracket 23, which is vertically lower than the supporting platform 13. The second support pillar 33 extends substantially parallel to the first support pillar 22. A horizontal metal plate 34 is welded to the upper end of the pillar 33.

The base member 18, first support pillar 22, and second support pillar 33 are all formed from hollow metal tubing of rectangular cross section.

A gusset 36 extends at an angle between the base member 18 and the first support pillar 22 for reinforcing the frame 11. The gusset 36 includes first and second triangular-shaped gusset plates 37 and 38, and a U-shaped gusset cap 41. The first gusset plate 37 is secured to the frame 11 along side surfaces of the base member 18 and the first support pillar 22. The second gusset plate 38 is spaced-apart from the first gusset plate 37 and is secured to the frame 11 along the opposite side surfaces of base member 18 and first support pillar 22. The gusset cap 41 extends between the spaced-apart gusset plates 37 and 38 and is secured to each upper surface thereof.

The gusset plates 37 and 38 are secured to the frame by welding, and the gusset cap 41 is welded to the frame and to each gusset plate.

The detachable operator seat 12 extends substantially parallel to the base member 18. The seat is attached to an upper end of the second support pillar 33 and to the seat bracket 23 by seat screws or bolts 42, which engage threaded holes respectively provided in the center of plate 34 and in the horizontal leg of bracket 23. The seat 12 is approximately nine inches in width, which is greater than the minimum effective frame width of seven inches established by the length of the L-shaped bracket member 27. The seat can be formed from any suitable material such as wood, metal, or a resin material, and the seat can conform to dimensions other than mentioned herein.

Alternatively, a seat may be provided which is attached to the second support pillar 33 without extending forward to the first support pillar. In this case, the seat bracket 23 would not be required.

Two spaced-apart threaded through holes 54 are located on the second support pillar 33 and the gusset plate 37. The holes 54 facilitate the storage of operator seat 12 when detached from the base 10. The spacing of holes 54 correspond to the spacing of the holes for screws 42 which secure the seat 12 to the base 10.

The loading press supporting platform 13 is welded to the upper end of the first support pillar 22. Through holes 43 are provided for removably securing the loading press 17 to the supporting platform 13 with two nut/bolt assemblies 46 (one shown).

The detachable cross member 16 is a metal tube of square cross section, which is removably attached to the bracket member 27 by bolts 47 which extend through aligned holes in opposite walls of member 16 and which engage threaded through holes 32 provided in the vertical leg 28 of bracket 27 on opposite sides of pillar 22. The cross member 16 is approximately twenty inches in length, which corresponds to the width of the frame 11 in a direction transverse to the base member 18, when the cross member 16 is attached to the bracket member 27. When attached, the rear and upper surfaces of the cross member 16 respectively abut the first and second legs 28 and 31 of the bracket member 27. The cross member 16 is vertically below the first leg 28, so that the cross member 16 is in contact with the floor and thereby supports the weight of the base 10 that is distributed to the L-shaped bracket member 27. The cross member 16 contacts the floor with two protective pads 48 disposed on the lower surface of the cross member 16 at the opposite ends thereof. The frame 11 additionally contacts the floor with a protective load bearing cap 51 disposed on the lower surface of the base member 18 at the rear end thereof. End caps 52 are partially disposed within each end of the cross member 16.

As shown in FIG. 5, a conventional long shackle lock serving as a locking device 53 can be utilized to disable the loading press 17 when not in use. A loop 56 of the lock encircles a hand-operated lever 57 of the loading press 17 and passes through the welded steel ring 26, to prevent pivotal movement of the lever 57.

OPERATION

The base 10 for supporting a loading press is operated in the following manner.

Initially, as shown in FIG. 5, the loading press 17 is fixedly secured to the supporting platform 13 using the nut/bolt assemblies 46 each extending through the respective holes 43 of the supporting platform.

Thereafter, the base 10 is configurable from a storage configuration to a working configuration, and vice versa. In both configurations, the loading press 17 remains secured to the supporting platform 13.

In the storage configuration, the detachable cross member 16 is detached from the L-shaped bracket member 27 by removing the bolts 47 and the detachable operator seat 12 is detached from the frame 11 by removing screws 42 from the threaded holes respectively provided in the center of plate 34 and in the horizontal leg of bracket 23. With the cross member and seat detached, the effective frame width of the base 10 is reduced to approximately seven inches with the loading press 17 remaining mounted thereon. This minimum frame width permits the base 10 to be easily stored in areas such as a closet, below a dresser, or below a bed. The detached cross-member can then be attached to pillar 22 through threaded holes 49, and the detached operator seat 12 can be attached to threaded holes 54 for storage.

Alternatively, in an intermediate storage configuration, the operator seat 12 remains attached to the frame 11 with the cross member 16 detached from the bracket member 27. In this configuration, the effective frame width of the base 10 is reduced to approximately nine inches, which may still permit the base to be stored in confining areas.

In the working configuration, the detachable cross member 16 and the seat 12 are attached to the frame 11. The cross member 16 is attached to the L-shaped bracket member 27 by installing bolts 47 through the threaded bolt holes 32 of the first leg 28. The seat 12 is attached to the threaded holes provided in the center of plate 34 and in the horizontal leg of bracket 23 by means of screws 42. The cross member 16, when attached to the bracket member 27, serves to stabilize the base 10 by increasing the effective frame width of the base to a maximum value to more efficiently distribute the weight of the base (and the weight of the operator and the loading press when the base is in use) across the floor.

When not in use, the loading press can be disabled by installing the loop 56 of the locking device 53 through the ring 26 and around the hand-operated lever 57, thus preventing the lever from being operated.

Although a preferred embodiment of the invention has been shown and described in detail for illustrative purposes, it will be recognized that there are variations or modifications of the disclosed embodiment, including the rearrangement of parts, which lie within the scope of the present invention.

The embodiments of the invention in which an exclusive property or privilege is claimed are defined as follows:

1. A base comprising:

a frame;

means for supporting an operator on said frame; and support means on said frame at a location vertically higher than said operator supporting means;

wherein said frame includes an approximately horizontally extending base member, a first support pillar secured to and extending upwardly from a first end of said base member, and a second support pillar secured to a second end of said base member remote from said first end and extending upwardly substantially parallel to said first support pillar;

wherein said support means includes a supporting platform at an upper end of said first support pillar and said means for supporting includes seat detachably secured to an upper end of said second support pillar;

wherein said frame further includes means for decreasing a width of said frame, said means for decreasing said width of said frame including a bracket member secured to a lower end of said first support pillar and extending transverse to said base member, and an elongate cross member extending transverse to said base member and detachably attached to said bracket member and having floor engaging means thereon to stabilize said frame.

2. The base as claimed in claim 1, wherein said support means further includes a loading press mounted on said supporting platform.

3. The base as claimed in claim 2, wherein said first support pillar includes means for facilitating disabling of said loading press.

4. The base as claimed in claim 3, wherein said means for facilitating disabling includes a steel ring secured below said platform.

5. The base as claimed in claim 4, wherein said frame further includes a gusset secured to and extending at an angle between said first support pillar and said base member.

6. The base as claimed in claim 5, wherein said gusset includes first and second spaced-apart gusset plates each attached to said first support pillar and said base member, and a gusset cap extending between and attached to said first and second gusset plates.

7. The base as claimed in claim 1, wherein said base member and said cross member each have at least one protective pad secured to a lower surface thereof, said protective pad on said cross member being said floor engaging means.

8. The base as claimed in claim 1, wherein said frame is formed from tubing of rectangular cross section.

9. The base as claimed in claim 1, wherein said cross member further includes end caps secured to both ends thereof.

10. The base as claimed in claim 1, wherein said seat is also releasably attached to a support bracket mounted on said first support pillar.

11. The base as claimed in claim 1, wherein said supporting platform includes means for facilitating securing of a loading press to said frame.

12. The base as claimed in claim 11, wherein said means for securing are spaced-apart through holes for bolts.

* * * * *